United States Patent [19]

Hoge et al.

[11] Patent Number: 5,374,003
[45] Date of Patent: Dec. 20, 1994

[54] TAPE THREADING SYSTEM FOR A HELICAL TAPE DRIVE

[75] Inventors: David T. Hoge, Westminster; John C. Owens, Arvada, both of Colo.

[73] Assignee: Storage Technology Corporation, Louisville, Colo.

[21] Appl. No.: 43,863

[22] Filed: Apr. 7, 1993

[51] Int. Cl.$^5$ ............................................... G11B 15/32
[52] U.S. Cl. ................................................... 242/332.7
[58] Field of Search ..................... 242/195; 360/85, 95; 226/91, 92

[56] References Cited

U.S. PATENT DOCUMENTS

| | | | |
|---|---|---|---|
| 4,742,407 | 5/1988 | Smith et al. | 242/195 X |
| 4,805,045 | 2/1989 | Schonfeld et al. | 242/195 |
| 4,832,284 | 5/1989 | Inoue | 242/195 |
| 4,991,037 | 2/1991 | Suimizu et al. | 260/95 X |
| 5,046,168 | 9/1991 | Ohsaki | 242/195 X |
| 5,155,639 | 10/1992 | Platter et al. | 242/195 X |

Primary Examiner—Daniel P. Stodola
Assistant Examiner—John P. Darling
Attorney, Agent, or Firm—Duft, Graziano & Forest

[57] ABSTRACT

A system is disclosed which threads a tape media leader block from a 3480-type cartridge to a takeup reel by aligning the tape media directly above the tape threading path, seating the leader block in the takeup reel, and lowering the tape media downwards onto the helical tape threading path guides by concurrently lowering the takeup reel and the tape cartridge onto the associated drive motor spindles. When the tape media is thus positioned in the tape threading path, the helical scan mechanism can then operate in conventional fashion to wrap a length of the tape media around the scanner for reading and writing data on the tape media.

8 Claims, 4 Drawing Sheets

TAPE THREADING SYSTEM FOR A HELICAL TAPE DRIVE

FIELD OF THE INVENTION

This invention relates to magnetic and optical recording and, in particular, to a system for threading a magnetic or optical tape media through a set of tape guides, wherein the tape media has a leader block which is too large to thread directly between the tape guides.

PROBLEM

In a helical scan tape drive that makes use of IBM 3480-type tape cartridges, the leader block attached to one end of the tape media is too large to thread through the tape threading path guides on a helical tape drive. It is therefore a problem in the field of 3480-type single reel tape cartridges to thread the tape media through the tape guides.

The 3480-type magnetic tape cartridge is an industry standard tape cartridge that consists of a substantially rectangular housing of predetermined dimensions within which is rotatably attached a single reel of tape. One end of the tape is secured to a leader block that is accessible to a tape threading arm in the tape drive via an opening in one corner of the tape cartridge housing.

In a conventional longitudinal tape drive system, the clearance between each pair of tape threading path guides is sufficient to allow the leader block to be threaded directly between the guides. However, when a 3480-type cartridge is used with a helical scan tape drive, the leader block is too large to fit between the tape threading path guides when the tape media is threaded directly (in a linear path) between the guides. Therefore, the tape media cannot be threaded by conventional mechanisms, which operate by threading the leader block and attached tape media directly between pairs of tape path threading guides in a linear path.

An alternative method of threading a leader block through the tape path threading guides employs a cammed mechanism to "weave" the leader block through the tape guides in a non-linear path. This could be accomplished by using a cammed mechanism. However, a mechanism which uses cams to thread the tape media is mechanically more complex and thus more expensive than a mechanism which threads the tape media linearly in a path directly between the guides.

SOLUTION

The above described problems are solved and a technical advance achieved in the field by the system of this invention which positions the tape media vertically relative to the tape threading path. The tape media leader block is threaded from the 3480-type cartridge to the takeup reel in a manner that aligns the tape media directly above the tape threading path. Once the leader block is seated in the takeup reel, an elevator mechanism lowers the tape media downwards onto the helical tape threading path guides by concurrently lowering the takeup reel and the tape cartridge along with the associated drive motors. When the tape media is thus positioned in the tape threading path, the helical scan mechanism can then operate in conventional fashion to wrap a length of the tape media around the scanner for reading and writing data on the tape media. The need for a mechanically complex cammed threading mechanism is thus obviated.

An alternative embodiment of the present invention keeps the takeup reel and the tape cartridge in a fixed position, and raises the tape threading path guides and helical scanner upward to cause the tape media to be threaded between the guides.

A third embodiment employs a lift mechanism to lower a pivotable platform supporting the takeup reel and the tape cartridge to thread the tape media between tape path threading guides.

BRIEF DESCRIPTION OF THE DRAWING

The invention may be better understood from a reading of the following description thereof taken in conjunction with the drawing in which.

DETAILED DESCRIPTION

Figure 1:
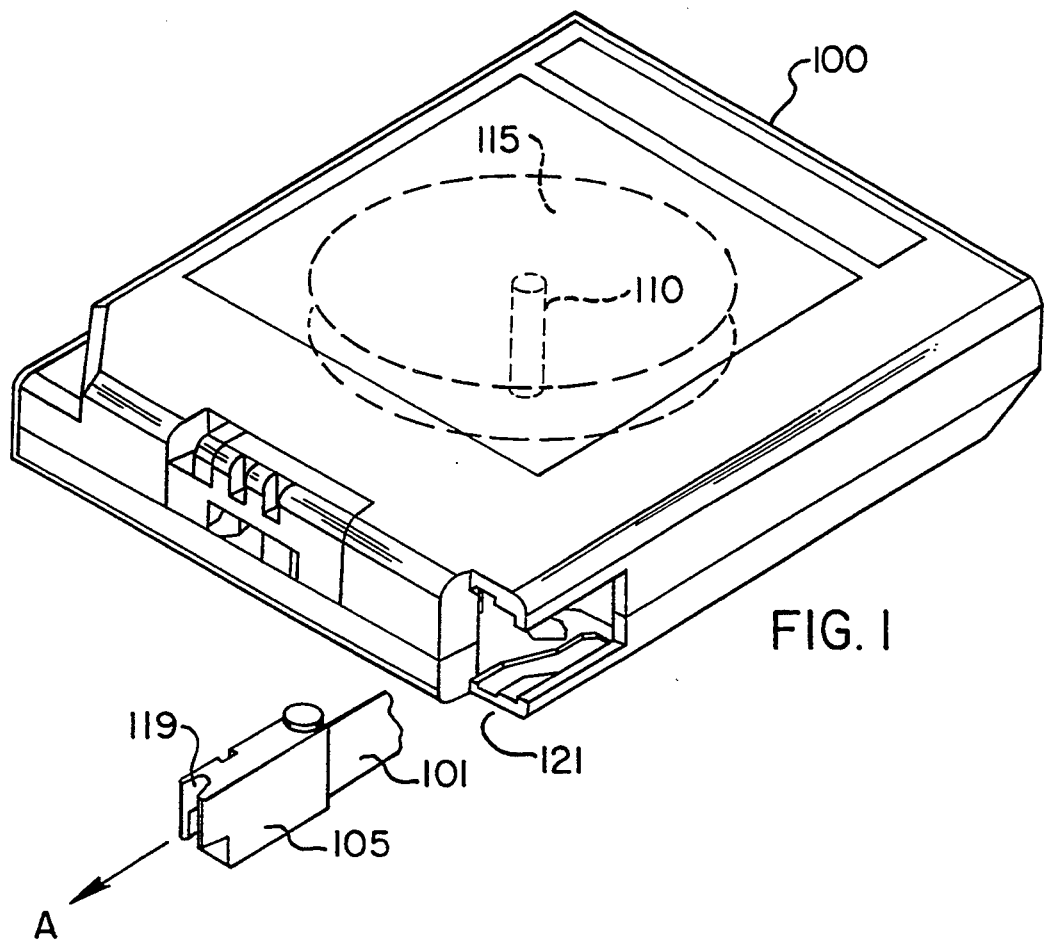
FIG. 1 illustrates, in perspective view, an IBM 3480-type tape cartridge with a leader block attached to the tape media.
Figures 2, 2A:
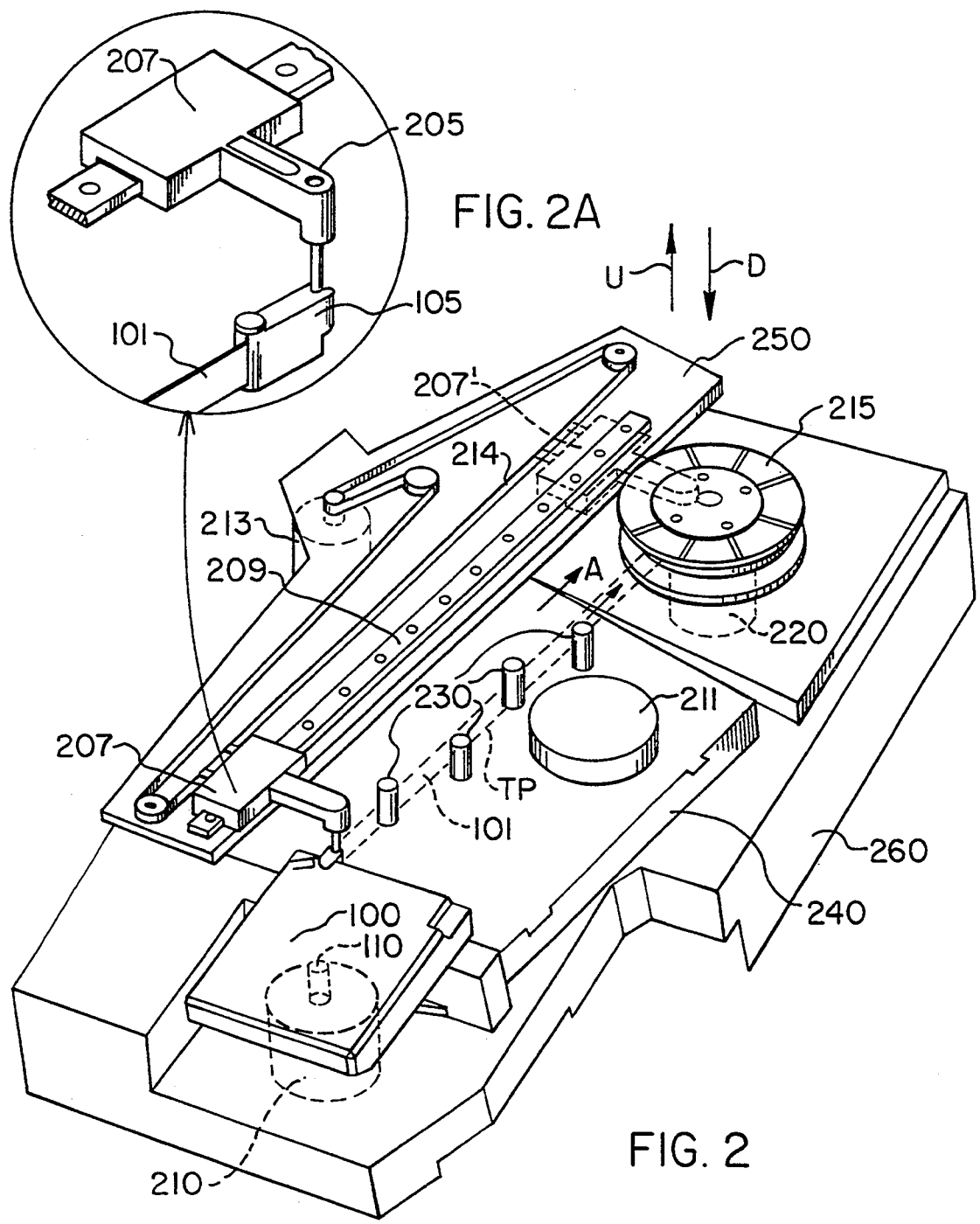
FIGS. 2 and 2A are perspective views of the tape threading system of the present invention.

Many conventional computer system tape transports utilize tape media cartridges having a form factor known as the IBM 3480-type cartridge form factor. FIG. 1 illustrates a perspective view of a typical ½" single reel 3480-type tape cartridge 100 equipped with a leader block 105. FIG. 2 is a perspective view of the tape threading system of the present invention. As shown in FIG. 1, tape cartridge 100 contains a single supply reel 115 on which the tape media 101 is wound. In operation, tape supply reel 115 in cartridge 100 engages supply reel spindle 110 in the tape drive unit (not shown). Tape cartridge 100 includes an opening 121 in the front of the cartridge housing through which the tape media 101 is accessed. Access to tape media 101 is provided by a leader block 105 which is attached to one end of the tape media 101 that is stored in the tape cartridge 100. The leader block mechanism preferrably used in the present invention is described in U.S. patent application, Improved Leader Block For Magnetic Tape Cartridge, Ser. No. 07/833/350, which is incorporated by reference herein.

Leader Block

A perspective view of leader block 105 is shown in FIG. 1. Tape media 101 has a first end which extends through the opening 121 in the tape cartridge 100 to enable the tape drive unit to extract tape media 101 from the tape cartridge 100 by means of leader block 105 which is attached to the first end of tape media 101.

Tape Threading Operation

Figure 3:
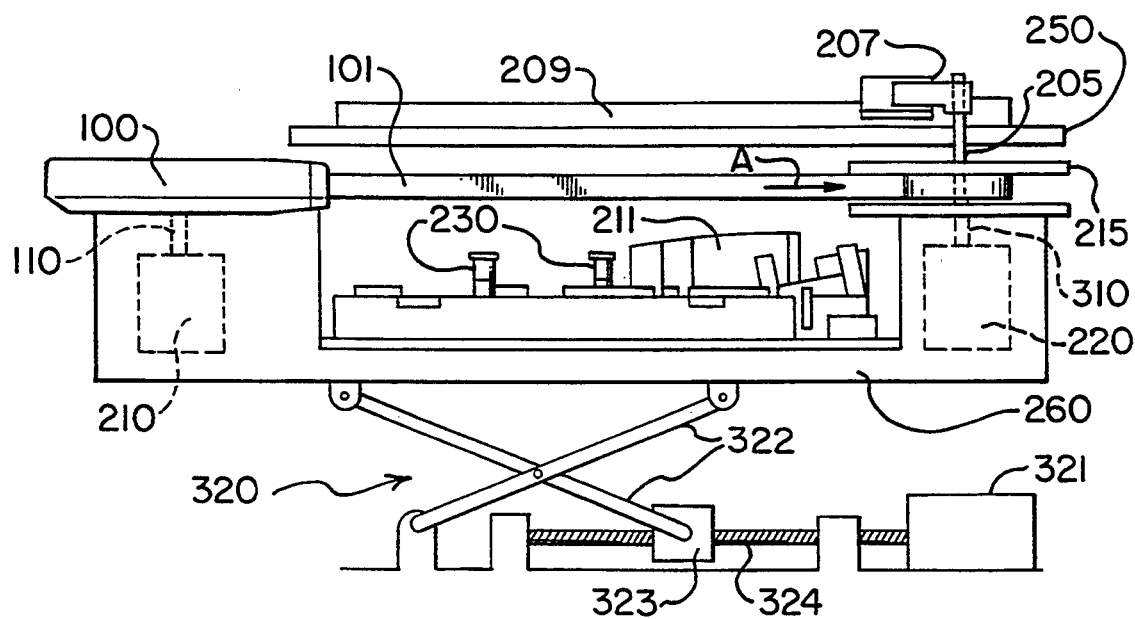
FIG. 3 is a side view of one embodiment of the present invention illustrating the tape media being drawn linearly above the tape threading path.

FIG. 2 is a perspective view of the tape threading system of the present invention, showing tape shuttle 207 in its initial position, as well as in a position wherein tape media 101 has been extended from tape cartridge 100 to take-up reel 215, as indicated at 207'. FIG. 3 is a side view of one exemplary embodiment of the present invention illustrating tape media 101 extended above the tape threading path TP (shown in FIG. 2). As shown in FIG. 3, prior to operation, tape cartridge 100 is loaded onto supply reel spindle 110 on the left side of tape elevator platform 260. Take-up reel 215 is continuously engaged with take-up motor 220 on the right side of tape elevator platform 260. At this point, tape cartridge 100 and take-up reel 215 are positioned on opposite ends and vertically above the tape threading path TP.

In operation, leader block 105 and attached tape media 101 are withdrawn from tape cartridge 100 through opening 121. This is accomplished by tape threading arm 205 on tape shuttle 207 engaging the threading arm slot 119 in leader block 105. A force is then applied to leader block 105 by tape shuttle 207 to pull leader block 105 out of tape cartridge 100 in the direction indicated by arrow A on FIGS. 1, 2 and 3. Tape shuttle 207 is moved by drive belt 214 which is driven by tape shuttle motor 213. Tape shuttle 207 travels along shuttle guide 209 which is mounted on tape shuttle platform 250. Tape shuttle platform 250 is in turn mounted on elevator platform 260. Tape shuttle 207 pulls leader block 105 linearly from tape cartridge 100 to takeup reel 215 in a manner that extends and aligns the tape media 101 directly above the tape threading path TP. Leader block 105 is then seated into takeup reel 215 by tape shuttle 207, as indicated at 207'. Tape shuttle 207 and threading arm 205 remain in a fixed position during tape transport operation.

Figure 4:
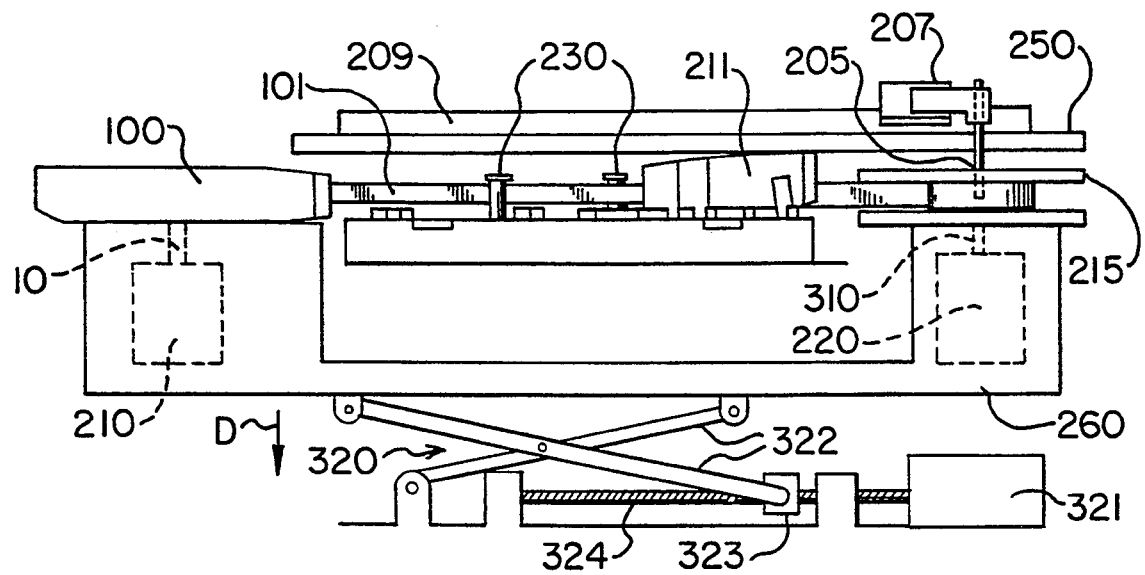
FIG. 4 is a side view of one embodiment of the present invention illustrating the tape media threaded through the tape guides after the tape media has been lowered between the tape guides.

FIG. 4 illustrates the embodiment shown in FIG. 3, wherein tape media 101 has been threaded through tape threading path guides 230 after the tape media 101 has been lowered in direction D between the tape guides 230. In order to thread tape media 101, elevator mechanism 320 lowers platform 260 in direction D to cause the extended tape media 101 to move downwards between the tape threading path guides 230. Elevator platform 260 also lowers the takeup reel 215 and the tape cartridge 100 and associated motors 210, 220, all of which are attached to elevator platform 260. Elevator platform 260 is lowered and raised by elevator mechanism 320, which is a scissor-type jack. Elevator mechanism 320 comprises a motor 321 which turns a threaded shaft 324. Threaded shaft 324 engages a threaded block 323 which moves horizontally to cause scissors 322 to vertically move elevator mechanism 320.

As shown in FIG. 4, the tape media 101 is thus threaded between the tape path threading guides 230 even though the leader block 105 is too large to fit between the guides 230 in a straight line path. Once the tape media 101 is positioned in the tape threading path TP, a tape wrapping mechanism (not shown) can then operate in conventional fashion to wrap a length of the tape media 101 around scanner 211 for reading and writing data on the tape media 101. Such tape wrapping mechanisms are well-known in helical scan technology.

Figure 5:
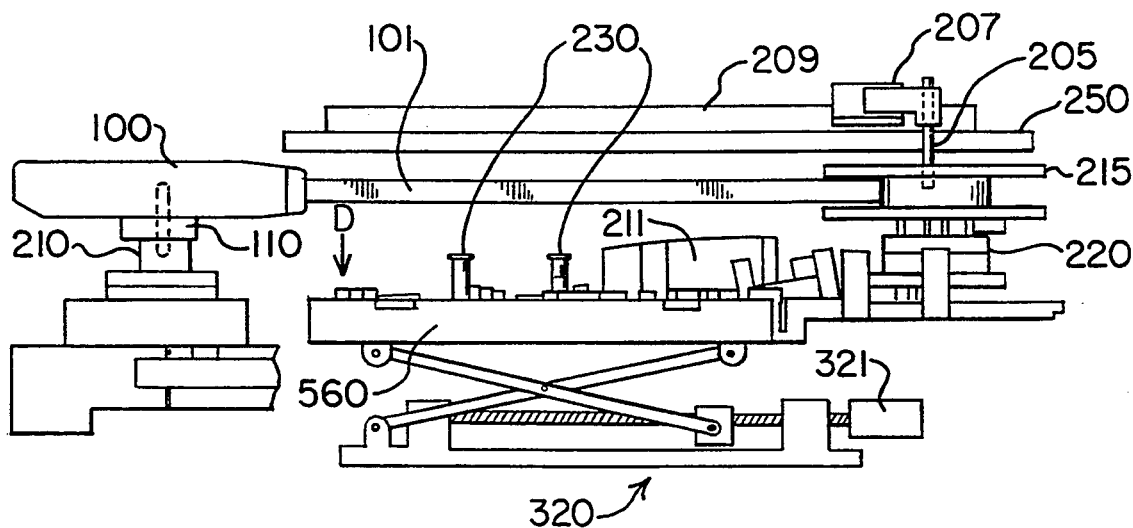
FIGS. 5 and 6 illustrate an alternative embodiment of the present invention wherein the tape scanner and tape guides are lowered and then raised into a position which causes the tape media to be threaded.
Figure 6:
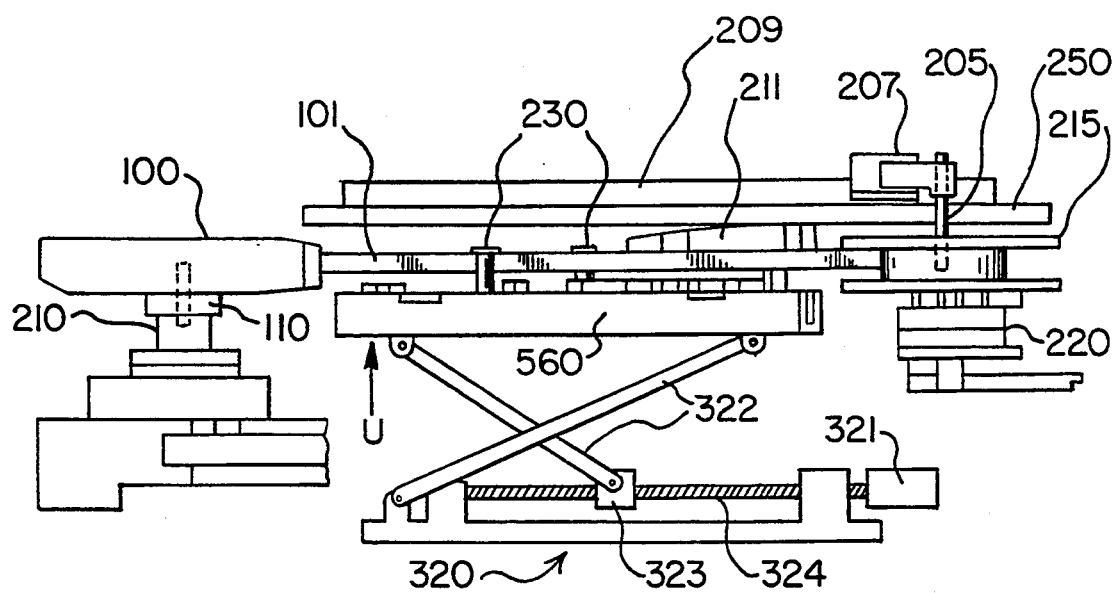

FIGS. 5 and 6 illustrate an alternative embodiment of the present invention wherein both scanner 211 and tape threading path guides 230 are initially lowered and then raised into a position which causes the tape media 101 to be threaded between the threading path guides 230. FIG. 5 shows guide platform 560 on which is mounted a set of tape path threading guides 230 and scanner 211. Prior to operation, guide platform 560 is lowered in direction D to an initial position below cartridge supply reel spindle 110 and take-up reel 215, as shown in FIG. 5. A tape cartridge 100 is then loaded onto cartridge supply reel spindle 110. Next, tape shuttle 207 conveys leader block 105 and attached tape media 101 from cartridge 100 to take-up reel 215 in a straight line path. Leader block 105 is then seated by tape shuttle 207 into takeup reel 215, in the manner described for the previous embodiment.

As shown in FIG. 6, guide platform 560 is then raised in direction U by elevator mechanism 320 so that the tape media 101 is threaded between the tape path threading guides 230.

Figure 7:
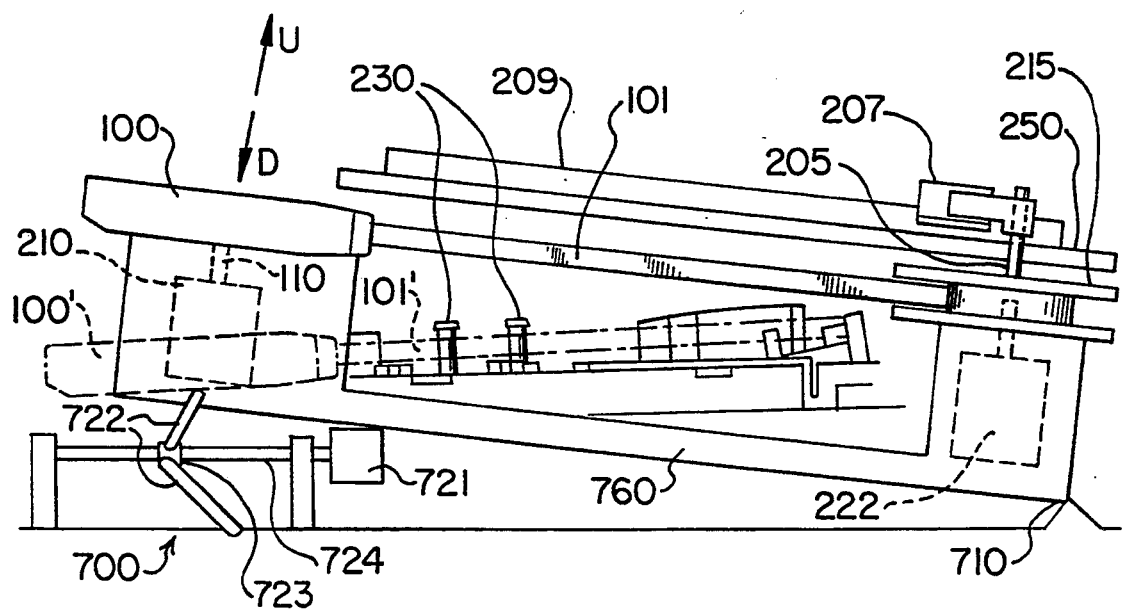
FIG. 7 illustrates an alternative embodiment of the present invention wherein a pivotable elevator platform is used to thread the tape media.

FIG. 7 illustrates an alternative embodiment of the present invention wherein a tape media lift mechanism 700 raises and lowers a pivotable elevator platform 760 in direction D to thread tape media 101 between tape path threading guides 230. In this embodiment, prior to operation, tape cartridge 105 is loaded onto supply reel spindle 110 on the left side of tape elevator platform 760. Take-up reel 215 is continuously engaged with take-up motor 220 on the right side of tape elevator platform 760.

Prior to operation, lift mechanism 700 raises the left end of elevator platform 760 in direction U so that tape media 101 and leader block 105 will clear tape path threading guides 230. The right end of elevator platform 760 pivots about pivot 710. Lift mechanism 700 operates on a scissor jack principle, and comprises a motor 721 connected to a threaded shaft 724. Threaded shaft 724 engages a threaded block 723 which moves horizontally to cause scissors 722 to move elevator mechanism 320 in a substantially vertical direction, U or D.

In operation, as in the previously described embodiments, tape shuttle 207 conveys leader block 105 and attached tape media 101 from cartridge 100 to take-up reel 215 in a straight line tape path TP above tape path threading guides 230. Leader block 105 is then seated into takeup reel 215. Elevator mechanism 700 then lowers platform 760 in direction D to cause tape media 101 to be threaded between the tape path threading guides 230, as shown by the dotted lines in FIG. 7.

It is to be noted that the system described herein is not limited to use with IBM 3480 form factor cartridges or with helically scanned tape drives. While a specific embodiment of this invention has been disclosed, it is expected that those skilled in the art can and will design alternate embodiments of this invention that fall within the scope of the appended claims.

We claim:

1. In a tape drive system utilizing tape media rotatably mounted on a reel contained within a cartridge, wherein a leader block is attached to one end of said tape media, said tape drive system having a take-up reel and apparatus for threading said tape media through a set of tape threading path guides, said apparatus comprising:

(a) elevator means for raising said cartridge and said take-up reel to a first position wherein said tape media is raised above said set of tape threading path guides and for lowering said cartridge and said take-up reel to a second position wherein said tape media is threaded between said set of tape threading path guides;

(b) means for grasping said leader block; and (c) shuttle means for extending said one end of said tape media above said set of tape threading path guides linearly from said cartridge to engage said leader block in said take-up reel while said elevator means is raised to said first position.

2. In a tape drive system utilizing tape media rotatably mounted within a cartridge, wherein a leader block is attached to one end of said tape media, said system having a take-up reel and apparatus for threading said tape media through a set of tape threading path guides, said apparatus comprising:
  (a) a platform upon which said set of tape threading path guides is mounted;
  (b) shuttle means for unwinding a section of said tape media in a linear path from said cartridge to engage said leader block in said take-up reel; and
  (c) elevator means for moving said platform between a first position wherein said set of tape threading path guides is spaced apart from said tape media and a second position wherein said tape media is threaded between said set of tape threading path guides.

3. The apparatus of claim 2, wherein said shuttle means includes means for grasping said leader block.

4. In a tape drive system utilizing tape media rotatably mounted within a cartridge, wherein a leader block is attached to one end of said tape media, said system having a take-up reel and apparatus for threading said tape media through a set of tape threading path guides, said apparatus comprising:
  (a) a pivotable platform upon which said set of tape threading path guides is mounted, wherein said platform is pivotable about one end;
  (b) shuttle means for unwinding a section of said tape media in a linear path from said cartridge to engage said leader block in said take-up reel; and
  (c) elevator means for causing said platform to pivot about said one end to thereby move the other end of said platform between a first position wherein said set of tape threading path guides is spaced apart from said tape media and a second position wherein said tape media is threaded between said set of tape threading path guides.

5. The apparatus of claim 4, wherein said shuttle means includes means for grasping said leader block.

6. In a tape drive system having a take-up reel and utilizing tape media rotatably mounted within a cartridge, wherein a leader block is attached to one end of said tape media, a method for threading said tape media through a set of tape threading path guides, said method comprising the steps of:
  (a) positioning said cartridge to a first position;
  (b) unwinding a section of said tape media linearly from said cartridge so that said tape media spans said set of tape threading path guides and said leader block engages said take-up reel; and
  (c) positioning said cartridge to a second position to thread said tape media between said set of tape threading path guides.

7. In a tape drive system having a take-up reel and utilizing tape media rotatably mounted within a cartridge, wherein a leader block is attached to one end of said tape media, a method for threading said tape media through a set of tape threading path guides comprising the steps of:
  (a) mounting said set of tape threading path guides on a platform;
  (b) moving said platform to a first position;
  (c) unwinding a section of said tape media in a linear path from said cartridge so that said tape media spans said set of tape threading path guides and said leader block engages said take-up reel; and
  (d) moving said platform to a second position to thread said tape media between said set of tape threading path guides.

8. In a tape drive system having a take-up reel and utilizing tape media rotatably mounted within a cartridge, wherein a leader block is attached to one end of said tape media, a method for threading said tape media through a set of tape threading path guides comprising the steps of:
  (a) mounting said set of tape threading path guides on a pivotal platform;
  (b) pivoting said platform to a first position;
  (c) extending said one end of said tape media linearly from said cartridge to span said set of tape threading path guides and to engage said leader block in said take-up reel; and
  (e) pivoting said platform to a second position to thread said tape media between said set of tape threading path guides.

* * * * *